Aug. 26, 1958  J. C. GROFF  2,848,901
DRIVE BELT
Filed Oct. 22, 1957
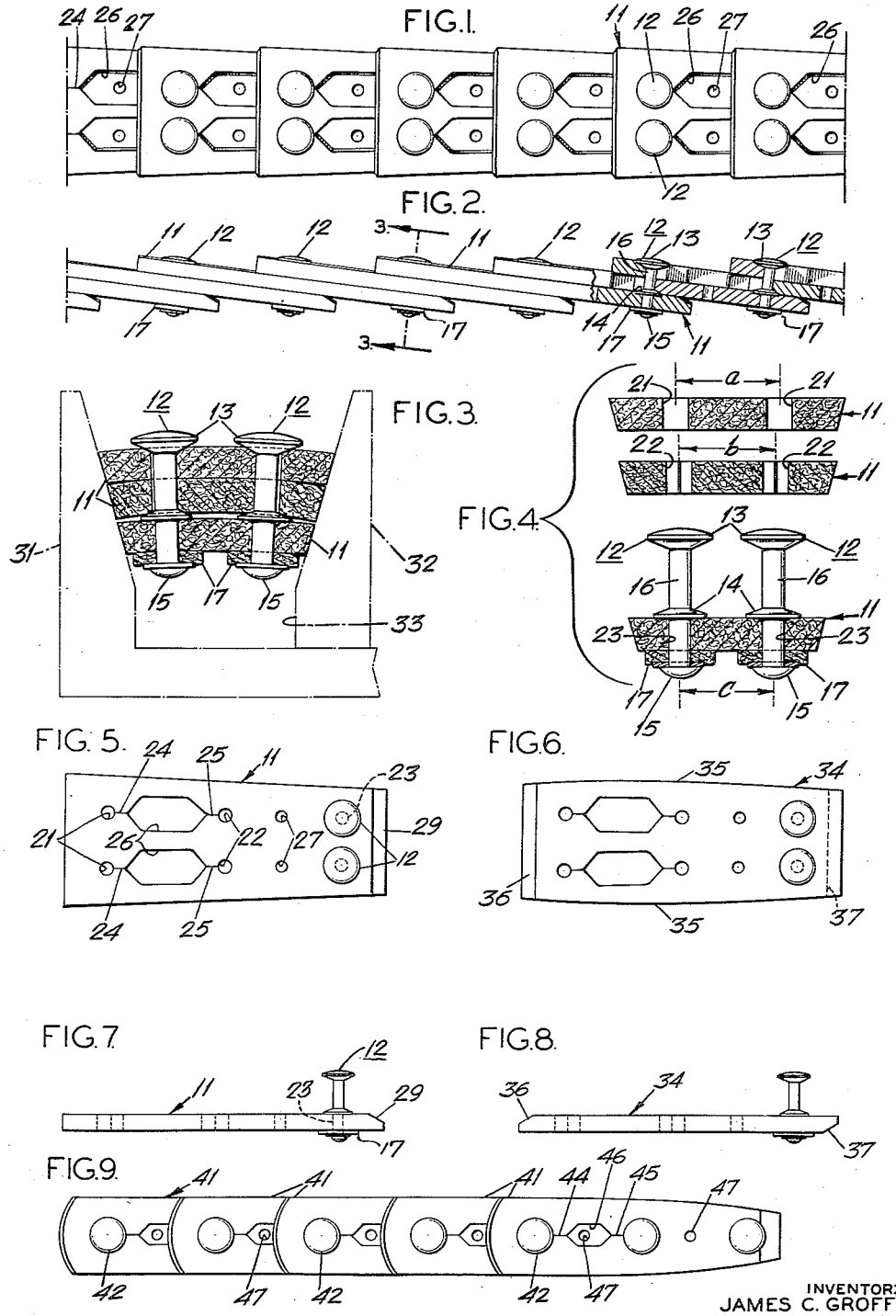
INVENTOR:
JAMES C. GROFF
BY Howson & Howson
ATTYS.

United States Patent Office 2,848,901
Patented Aug. 26, 1958

2,848,901

DRIVE BELT

James C. Groff, Manheim, Pa., assignor to Manheim Manufacturing and Belting Company, Manheim, Pa., a corporation of Pennsylvania Application October 22, 1957, Serial No. 691,678

6 Claims. (Cl. 74—233)

The present invention relates to new and useful improvements in driving belts, and more particularly the driving belts of a type comprising a number of superimposed links secured together by suitable fastening means which pass through openings formed in the links.

The present invention has particular application to belts for use in variable speed transmissions employing variable pitch sheaves.

Variable pitch sheaves comprise two confronting wall sections defining therebetween a generally V-shaped groove for receiving the transmission belt. Means is provided to vary the spacing between the wall section of the sheave to enlarge or reduce the clearance therebetween defining the groove. At maximum spacing, the belt rides adjacent the bottom of the groove and the sheave operates as a pulley of small diameter. Minimum spacing, on the other hand, reduces the clearance and causes the belt to ride adjacent the outer periphery of the groove to simulate a pulley of larger diameter. Since the V-belt never bottoms in the groove it is supported by its edges and with conventional V-belts, there is a tendency for the center portion of the belt to flex inwardly toward the bottom of the groove which reduces the life of the belt and in severe cases may permit the belt to approach the bottom of the groove and change the effective diameter of the sheave.

Attempts have been made to overcome the tendency for inward flexure by molding the belt with a slight convex curvature so that the belt arches between the opposed elements of the sheave. Fabrication of a belt of this character which is formed of superimposed links is not entirely satisfactory, and the present invention provides a belt having a convex cross section formed by conventional stamping operations without the necessity for complex molds or other complicated fabrication procedures.

In addition to the foregoing, some difficulty is encountered by reason of air-entrapment under the belt as it passes around the pulley. This condition was tolerated in the prior art, in the belief that sufficient air would escape past the edges of the belt between the belt and the pulley. The V-belts made in accordance with the present invention conform to the sides of the pulley and do not permit air to escape as readily. The present invention provides means for venting the air from under the belt as it is trained about the pulley.

With the foregoing in mind, a primary object of the present invention is to provide a belt of the stated character which is fully effective in operation and use and which operates to provide the desired functional characteristics.

More specifically the invention contemplates a belt wherein the links of the belt are individually fabricated in flat form and wherein the fastening means, during assembly of the belt, operates to flex the belts to provide the desired convex curvature thereof.

In addition the present invention provides vent holes in the belt which cooperate with the fastener apertures to provide air passages through the assembled transmission belt.

All of the objects of the present invention and the various features and details of the construction and operation thereof are more fully set forth hereinafter and described with reference to the accompanying drawings, in which:

Fig. 1 is a plan view of a transmission belt embodying the present invention;

Fig. 2 is a side elevational view of the belt shown in Fig. 1 with portions broken away to show details of the construction of the belt;

Fig. 3 is a transverse sectional view taken on the line 3—3 of Fig. 2 showing a variable pitch sheave in broken lines to illustrate the operation of the belt;

Fig. 4 is an exploded sectional view of the belt illustrating the mode of obtaining the convex curvature thereof in assembling;

Fig. 5 is a plan view of a link of the belt showing fasteners mounted therein;

Fig. 6 is a view similar to Fig. 5 of a modified form of link;

Figs. 7 and 8 are side elevational views of the links shown in Figs. 5 and 6 respectively; and Fig. 9 is a plan view of a belt embodying the venting means of the present invention.

Referring now to the drawings, and more particularly to Figs. 1 and 2 thereof, the belt comprises a plurality of superimposed links 11 held together by studs or fasteners 12 each having an outer head 13, a shoulder 14 and an inner head 15, mounted on a shank 16. The outer head 13 and the shoulder 14 are spaced apart a distance to receive therebetween two thicknesses of the links 11, and, as shown in Fig. 2, the shoulder 14 is spaced from the head 15 to receive therebetween a single thickness of link 11. A wear washer 17 is mounted between the inner head 15 and the under surface of the inner link 11.

The links 11 are provided with registering apertures for receiving the shanks 16 of the studs 12. As shown in Fig. 5 the links are provided with forward apertures 21, intermediate apertures 22 and trailing apertures 23. When the links are assembled in superimposed relation, the trailing aperture 23 is in registry with the intermediate aperture 22 of the upwardly adjacent link, and the intermediate aperture 22 is in registry with the forward aperture 21 of the upwardly adjacent link, so that each stud passes through the aperture 23 of the innermost link, the aperture 22 of the intermediate link and the aperture 21 of the outermost link. For ease of assembly, the apertures 21 and 22 are interconnected by slits 24 and 25 and a central enlarged opening 26. In addition the links are provided with vent openings 27 which register with the mounting openings 26 of the upwardly adjacent link when the links are assembled in superimposed relation as shown. As shown in Figs. 2, 5 and 7, the trailing edge of the link is bevelled on its upper side as indicated at 29 to provide increased flexibility of the belt as it is trained about the pulley or sheave.

In accordance with the present invention the links 11 are formed to automatically assume a convex curvature upon assembly in superimposed relation. As shown, the stud-receiving apertures are arranged in pairs along the length of the link so as to receive the pair of studs 12. As shown clearly in Fig. 4, the spacing $a$ between the apertures 21, 21 of each link is greater than the spacing $b$ between the apertures 22, 22 of each link, and the spacing $b$ is greater than the spacing $c$ between the apertures 23, 23, of each link.

When the studs are assembled to the links, their natural tendency is to dispose themselves parallel and perpendicular to the links as shown in Fig. 4, by reason of the spacing of the shoulder and the heads of the stud to correspond with the thickness of the links. However, due to the increased spacing of the apertures 22 and 21 at b and a respectively the studs when assembled into the link apertures diverge outwardly slightly as shown in Fig. 3. The outward divergence of the studs, in turn, causes a convex flexure of the links to the configuration desired to reduce the tendency of the links to flex inwardly during travel over the variable pitch sheave, the elements of which are designated at 31 and 32 in Fig. 3. By the construction and arrangement of the stud-receiving apertures, it is possible to obtain the convex curvature of the belt by simple stamping and assembly operations without the necessity for molding the belt in the convex form of the prior art.

Another important feature of the belt of the present invention is the venting afforded by the openings 26 and 27. As shown in Fig. 2, the opening 27 is spaced rearwardly from the aperture 22 a distance greater than the spacing between the aperture 23 and the trailing edge of the link so that the opening 27 is exposed from the under surface of the assembled belt. As pointed out above, the opening 27 registers with the opening 26 which is exposed to the outer surface of the assembled belt whereby a free passage for air is provided through the belt. This insures against entrapment of air between the belt and the bottom of the groove 33 defined between elements 31 and 32 of the pulley or sheave.

It is not necessary that the links 11 take the precise form shown in Fig. 1. For example, during or following assembly of the links, they may be trimmed to eliminate the outwardly projecting corners evident in Fig. 1. A trimmed link is shown in Fig. 6 wherein the longitudinal edges of the link are slightly arcuate in form as shown at 35, 35. The apertures and openings in the link 34 are identical to the apertures and openings in the link 11, but the leading and trailing ends of the links are both bevelled. The outer leading corner of the link 34 is bevelled as indicated at 36 to reduce the wind resistance of the belt which is especially desirable in high speed operations. A bevel 37 is provided at the trailing end of the link to serve a function similar to the function of the bevel 29. As shown, the bevel 37 is on the inner corner of the trailing edge rather than the upper corner as shown at 29. The trimmed form of link may be used with or without the bevels and the leading bevel 36 may also be used with the form of bevel shown at 29 or without any bevel at the trailing edge of the link. Likewise, the bevel 37 may be used with or without the bevel 36 at the leading edge of the link and with or without the trimming of the longitudinal edges of the link.

A link-type transmission belt embodying the invention described above, but without the double stud arrangement is shown in Fig. 9. This form of belt comprises a plurality of links 41 assembled in superimposed overlapping relationship by studs 42. The studs 42 pass through stud-receiving apertures similar to the apertures 21, 22 and 23 described above. As shown, the leading and intermediate apertures in the links 42 are connected by slits 44 and 45 and intermediate openings 46. A vent opening 47 is provided in a manner similar to the opening 27 of the previously described embodiment. Thus the openings 46 and 47 provide free passage of air from the lowering belt in the same manner and for the same purpose as described above in connection with the openings 26 and 27.

The foregoing embodiments of the present invention have been described in connection with transmission belts in which the fasteners pass through three superimposed links, but it is to be understood that with slight modification the invention is equally applicable to belts in which the fasteners pass through four or more links. In addition, the fasteners need not take the specific form shown in the drawings, but other forms of fasteners may be used, for example, such fasteners as shown in the patents to Ginder No. 2,639,622 and Wiker No. 2,756,604.

Other modifications are possible within the scope of the present invention as defined by the appended claims.

I claim:

1. A laminated driving belt comprising a plurality of links arranged in superimposed successive overlapping relation, each of said links having a plurality of apertures arranged in pairs respectively at the forward, intermediate, and trailing portions of said link, fastening means extending through the apertures in the overlapping portions of the links and having means at the opposite ends thereof engaging the innermost and outermost links to secure said plurality of links together, said pair of apertures at the forward end of each of said links being spaced apart a distance greater than the spacing of said pair of apertures in the intermediate portion of said link, and the spacing of said pair of said intermediate apertures being greater than the spacing between the pair of apertures at the trailing portion of said link, the forward portion of said link being outermost and the trailing portion of said link being innermost in said succession of said superimposed overlapped links whereby said fastening elements diverge outwardly and effect outwardly convex flexure of said links transversely thereof.

2. A laminated driving belt according to claim 1 wherein the fastening means comprises pairs of studs engaging at least three links, each stud having a shank passing through the forward aperture of the outermost link, the intermediate aperture of the intermediate link and the trailing aperture of the innermost link.

3. A laminated driving belt according to claim 1 including openings in said links intermediate adjacent pairs of said apertures, the openings between said intermediate and trailing pairs of apertures in the intermediate links registering with the openings between the forward and intermediate pairs of apertures in the outermost links, and being spaced rearwardly from the forwardly adjacent apertures a distance greater than the spacing between said trailing pair of apertures and the trailing end of said link whereby said openings form an uninterrupted passage for air from the inner side of said belt to the outer side thereof.

4. A laminated driving belt according to claim 3 wherein the openings between the forward and intermediate pairs of apertures comprise elongated mounting openings disposed longitudinally of the belt and connected to said forward and intermediate apertures by slits.

5. Apparatus according to claim 1 wherein each of said links is bevelled at at least one of the forward and trailing end edges thereof.

6. Apparatus according to claim 1 wherein the longitudinal side edges of said links are trimmed to arcuate form to provide a smooth contour to the assembled driving belt.

References Cited in the file of this patent

UNITED STATES PATENTS

| | | |
|---|---|---|
| 1,382,888 | Brammer | June 28, 1921 |
| 1,661,300 | Perpall | Mar. 6, 1928 |
| 2,249,726 | Brammer | July 22, 1941 |
| 2,455,400 | Brammer | Dec. 7, 1948 |